Apr. 24, 1923.
P. M. KLEIN
1,452,645
PISTON RING AND METHOD OF MAKING SAME
Filed Dec. 26, 1918
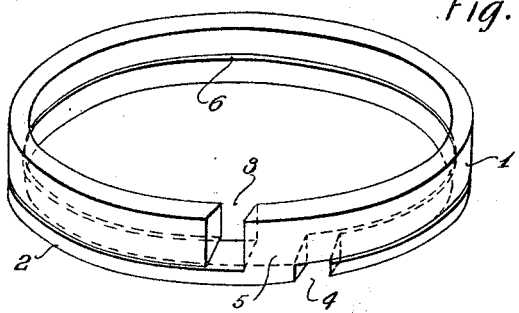
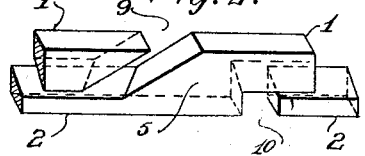
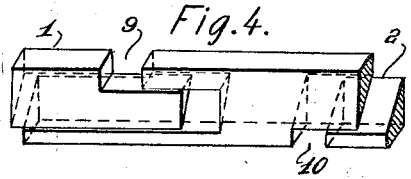
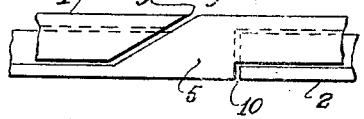
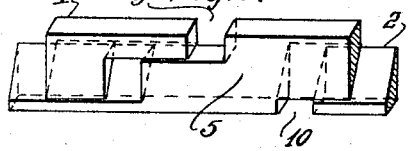
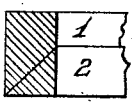
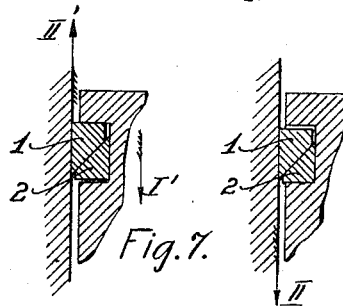
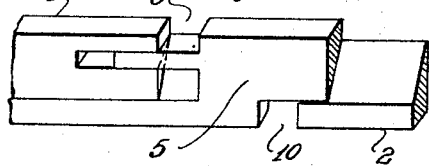
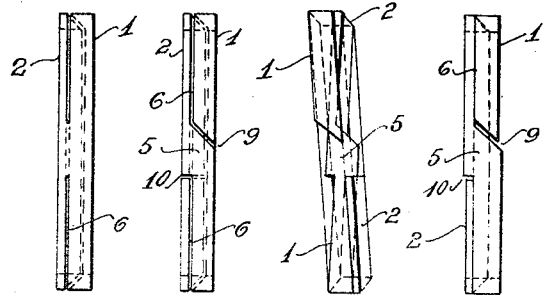
Inventor
Paul M. Klein Patented Apr. 24, 1923.

1,452,645

UNITED STATES PATENT OFFICE.

PAUL M. KLEIN, OF CEDARHURST, NEW YORK.

PISTON RING AND METHOD OF MAKING SAME.

Application filed December 26, 1918. Serial No. 268,437.

*To all whom it may concern:*

Be it known that I, PAUL M. KLEIN, citizen of the Czecho-Slovak Republic, and resident of Cedarhurst, L. I., in the county of Nassau and State of New York, have invented certain new and useful Improvements in Piston Rings and Methods of Making Same, of which the following is a specification.

This invention relates to resilient piston packing rings and the process of their manufacture.

The object of the invention is to provide a very flexible piston ring assuring through its peculiar construction a perfect fit with the cylinder wall during each upward and downward stroke of the piston, even in cases where the cylinder is untrue.

In the accompanying drawings Figure 1 is a perspective view of one form of my piston ring.

Figures 2, 3, 4, 5 and 6 represent different ways of joining the ring ends.

Figures 7 and 8 are partial sectional views through an untrue cylinder and piston with my piston in its respective working positions.

Figure 9 is a front view of a partly severed ring blank.

Figures 10 and 14 are views similar to Figure 9 showing a completed cutting operation.

Figure 11 is a front view of a severed ring with its ends twisted and turned outward.

Figure 12 is a front view of the same after being brought back to its relative original position with its straight faces turned outward.

Figures 13 and 15 are front views of rings faced down to desired even width, before or after being expanded radially outward.

Figure 16 is a sectional view through a portion of an alternate ring form.

Referring to the drawings Figure 1 illustrates one form of a finished ring, consisting of a metallic or other band cut on a bevel for almost its entire circumference, and severed at points 3 and 4 of its faces lying about opposite each other, thus forming practically a double or a twin ring, or two rings joined together at one end and free at their other ends.

The upper ring 1 is preferably made larger in its cross section than the lower ring 2, both showing either the forms of a larger and a smaller trapezoid (Figures 7 and 8), or a trapezoid and a triangle (Figure 16).

Both free ends of the rings may overlap with the solid ring connecting portion 5. However it matters little how the free ring ends are shaped as there is no possibility of a leak. It may be advantageous to cause the upper ring to overlap with the connecting portion 5. A few different ways are shown in Figures 2, 3, 4, 5 and 6. The most practical manner from the standpoint of economical manufacture is shown in Figures 14 and 15 where the annular tapered cut 6 starts on a curve at one side of the rings indicated at 7, continues in a straight line around until terminating at the other side of the ring on an outward curve at 8, which lies opposite the starting point 7. Thus the cut extends for more than 360° around the ring's circumference.

Figure 9 shows another way of cutting whereby the tapered circumferential cut 6 represents one operation and the severing cuts 9 and 10 in Figure 10 two other operations. Similar to the second way of cutting, the connections of the free ring ends shown in Figures 4, 5, and 6 are accomplished by first making the circumferential cut, then severing the ring at 10 and finally gapping it in any convenient manner at 9. In order to make the interlocking connections shown in Figs. 4, 5, and 6 at 9, a ring blank of larger size than for which the ring is intended is employed. First a gap is made similar to that indicated at 10, whereafter the few overlapping ends are milled to the the desired shape. When this is done, the ring is readily compressed to its future size.

Figure 16 illustrates how the portions 1 and 2 contact at their conical surfaces, when installed in a true cylinder.

It is clearly seen that there can be no escape of gases between the rings themselves or the piston rings and the cylinder. However it is found in practice that in a great many cases a slight wear on one side of the cylinder may take place especially when inferior piston rings have been in use.

Figures 7 and 8 demonstrate in exaggerated form how my ring will operate when installed in an untrue cylinder. The most important work of a piston ring in a combustion engine is that of holding perfect compression, that is to be perfectly tight at the upward piston stroke as shown in Figure 8.

The direction of the piston stroke is indicated by the arrow I and that of the friction between the cylinder and the ring by the arrow II. When installed in a true cylinder, the ring, due to its natural expanding properties incorporated therein by my process which will be explained later, expands evenly against the cylinder wall and completely fills the piston groove.

When installed in a worn out cylinder the ring again expands evenly, and engages the cylinder wall under friction, but leaves a free play space in the groove.

The circumferential surface of the upper ring portion 1 being larger than that of the lower ring portion 2 causes a far greater frictional engagement with the cylinder wall than the latter, permitting the lower ring portion 2 to easily shift its position.

During the upward stroke of the piston the lower ring portion 2 bearing with its beveled surface against the beveled surface of the upper ring portion 1, is forced into the groove and presses the upper ring portion still harder against the untrue piston wall, thus assuring a perfect fit therewith.

At the downward travel of the piston indicated by the arrow I' the direction of frictional resistance indicated by arrow II' is reversed (Figure 7).

When the piston has reached its highest point the piston ring assumes its normal state, that is, bears evenly with both the upper and lower portion against the cylinder wall.

When starting the downward motion the friction between the large upper ring portion 1 and the wall causes that ring portion to adhere to the cylinder and simultaneously forces the lower ring portion 2, which is in lesser frictional engagement with the wall, to travel, sliding upon the bevel, toward the piston, thus filling the free groove space.

Once in the groove the lower portion 2 again acts as a wedge and assures a perfect fit of the ring in the untrue cylinder.

The ring being composed of practically two rings, which are sprung together so as to bear against their beveled surfaces, is far superior as to its flexibility to a solid or partially split ring, and has the advantage over multiple rings, being as flexible as they, but made of one piece only. Its construction and method of manufacture assures a perfect and instantaneous self adjustment to any untrue cylinder, exerts a positive and all-around even and truly radial pressure against the cylinder wall and makes its installation an exceedingly simple operation.

In order to attain the desired features of the ring a succession of operations is necessary, representing the mode or process of manufacture.

A solid ring blank is turned to the exact diameter of the cylinder at its outer circumference, and to the diameter of the piston ring groove at its inner circumference. Then the blank is cut on a bevel or cone in such a way as to sever the blank into two practically parallel rings, one having an inward cone, the other possessing an outward cone. There may be employed different ways of severing the ring; however the simplest operation is indicated at Figure 14, as explained previously, representing one continuous cutting operation from one face of the ring to the other. The cutting may be done by a band saw or circular cutter or miller of small diameter.

After completing the cutting operation the two ring portions are twisted in such a way that the straight faces of the ring portion touch each other; in other words, the two ring portions are passed by each other so as to acquire a sort of helical form compared with their original parallel relation to each other.

While in this twisted form the double ring is subjected to the well known treatment of neutralizing the molecular strains in the ring material exerted by the unnatural twisted position of the ring. This treatment consists of hammering or heating the ring until the forcibly created internal strains totally disappear, that is, when the former tight contact of the straight ring faces becomes rather slack. While the hammering method is preferable in many instances, a heating process is more advantageous for quantity production. A temperature of 1050 degrees Fahrenheit corresponding to a color termed low, dark or blood red will completely change the molecular arrangement of cast iron, while a temperature of 990 degrees Fahrenheit, termed dark blood red or black red heat, will cause but a partial change of its molecules.

The twisted ring requires the treatment under the higher temperature, whereafter a very slow cooling is to take place.

The next operation after cooling is re-twisting the ring portions into their former relative positions whereby the molecules are again brought under strain. This strain causes the two ring portions to press against each other sidewise, one beveled face bearing against the other.

Following the re-twisting operation the ring is slightly spread or pried outward radially from the center toward its circumference and in this expanded position again heat treated, this time at the lower temperature of 990 degrees, thus preserving its formerly acquired tendency to spring together. Again the ring is cooled off slowly. The spreading operation assures a perfectly even and forceful expansion of the ring against the cylinder walls.

The operation of twisting the ring and expanding it by subjecting it to a temperature of about 1050 degrees Fahrenheit, while thus twisted and expanded will greatly simplify the process.

After either one of the separate heat treatments or the combined heat treatment, the ring may be faced and finished.

The above description of the process makes it clear that there is an entirely new principle employed, different from the one in common practice, where it is usual to start out with a ring blank of a somewhat larger diameter than that of the cylinder. Rings manufactured in such a way never can be true. My process prescribes starting out with a ring of the exact cylinder diameter, and the forcible radial expansion of the ring, after cutting it into practically two rings, supplies the necessary expanding properties causing the ring to bear against the cylinder wall. Its spreading or enlargement extends along double the length of its original circumference in perfectly even distribution upon all of its parts.

Having thus described my invention I claim:—

1. A double piston ring contacting under tension conically between its faces for almost its entire circumference and expanding evenly under tension in radial direction.

2. A one piece double piston ring severed on a cone between its faces for almost its entire circumference, a solid portion joining the separated ends, the free ends terminating in close proximity to each other.

3. A one piece twin piston ring split conically between its faces in the direction of its vertical axis, forming two parallel rings joined at a solid portion, the free ends of said rings terminating near each other, said parallel rings pressing with their bevels against each other and expanding together radially outward.

4. A one piece twin piston ring conically contacting and sprung together, the cross section of one ring portion resembling a large trapezoid, the other ring portion resembling in cross section a smaller trapezoid, both ring portions functioning like wedges when in the piston groove.

5. A one piece twin piston ring cut on a cone in half, each half representing an almost complete ring, said halves being twisted past each other to cause a spring action in the ring material, forcing the rings against each other, both halves adapted to expand thus assuming a larger diameter when not compressed.

6. A one piece double piston ring cut on a cone into two almost complete rings, said rings pressing against each other by internal force in the direction of their central axis, the one ring having a larger cross section than the other, both rings expanding evenly outward in radial direction.

7. A one piece double piston ring cut on a cone into two almost complete rings, said rings pressing against each other and radially outward by internal force.

8. A one piece twin piston ring cut on a cone in two almost complete rings, said rings pressing against each other in the direction of their center axis, and expanding radially outward by the resiliency of the material they are made of.

9. The process of producing a double piston ring contacting on a cone which comprises cutting a ring blank on a slant almost entirely around its circumference, starting at one face of the blank and ending near the starting point at its other face, forcing the severed ring portions against each other, and expanding the ring evenly outward in radial direction.

10. The process of producing a double piston ring contacting conically which comprises severing a ring blank on an angle along its circumference and almost entirely around, leaving but a short connecting part between the severed portions, forcing said portions toward each other so that their respective cones contact, and expanding them radially to a greater diameter than that of the original ring blank.

11. The process of producing a double piston ring contacting on a taper which comprises severing conically a ring blank along its circumference so that the severed ends lie substantially opposite each other, leaving a connecting part between the two faces of the blank, forcing the severed portions together to close the slot formed between the two tapered portions and expanding the ring.

12. The process of producing a double piston ring contacting conically which comprises severing a ring blank circumferentially on an angle starting at one face and terminating at the other face of the blank, leaving but a small connecting part between the thus formed two parallel rings, twisting the double rings into a helix, subjecting the thus formed helix to a treatment removing the molecular strains caused by the distortion of the double ring into the helix, reverting the helix to the original ring shape and expanding it radially.

13. The process of producing a double piston ring contacting on a cone which comprises severing a ring blank circumferentially, starting at one face and terminating at the other face of the blank and leaving a substantially small connecting part between the thus formed parallel double ring, converting said double ring into a helix, treating the thus formed helix to remove molecular strains caused by the distortion, and reverting the helix to the original double ring, the contacting conical portions of which are now being forced against each other axially by internal molecular strains.

14. The process of producing a conically contacting parallel twin ring which comprises splitting on an angle a ring blank along its circumference, converting said twin ring into a helix, changing the molecular arrangement of the ring in its helical form thus removing internal strains, twisting said treated helix into the original twin ring shape having its conical contacting portions held under newly created molecular strain, forcing them against each other axially.

15. The process of producing a conically contacting parallel twin ring which comprises severing on an angle a ring blank along its circumference to a parallel double ring, leaving but a small part uncut, forming the double ring into a helix, subjecting the helix to a treatment of changing molecular strain, converting the thus treated helix to its original parallel ring shape, expanding the ring radially, treating it while expanded to retain its shape, releasing it and machining the ring to desired finish.

16. The process of producing a conically contacting parallel twin ring which comprises splitting on a bevel a ring blank along its circumference, thus forming a double ring joining at a small uncut portion, twisting the parallel double ring into a helical shape changing the molecular arrangement of the helix and retwisting it thereafter to its original parallel ring shape.

17. The process of producing a conically contacting parallel twin ring which comprises splitting on a bevel a ring blank along its cirfumference to a double ring holding together at a small uncut portion, springing the conical portions against each other, expanding the ring and machining the double ring to even width and true circumference.

18. The process of producing a one piece double piston ring which comprises turning to the desired diameter a ring blank, splitting said blank, forming two almost complete rings, treating said split ring to cause the two rings to spring together, facing off the sides to even with, expanding the finished double ring to a greater diameter, treating the thus expanded ring to remove molecular strains and releasing the ring.

19. The process of producing a one piece double piston ring which comprises turning to the desired diameter a ring blank, splitting the blank, forming two almost complete rings joined at one end, free at the other, one ring of larger cross section than the other, reversing the position of the rings, heating the thus distorted rings to about 1050 degrees Fahrenheit, cooling them off slowly, forcing them back into their original positions after cooling, facing them to even width, expanding them radially, heating them in their expanded form to about 990 degrees Fahrenheit, cooling them slowly while expanded and releasing them after cooling off.

20. The process of producing a one piece double piston ring which comprises turning a ring blank to the desired cylinder diameter, cutting the ring blank on a bevel into a double ring by one continuous cut, starting at one face and terminating at the other, twisting the double ring so that their straight faces meet, subjecting the thus twisted double ring to a heat treatment to neutralize the molecular strains caused by the distortion of the double ring, slowly cooling off the ring while still distorted, retwisting and releasing the cooled off ring and facing and finishing the same.

21. The process of producing a flexibly expanding piston ring which comprises turning a solid ring blank to the exact diameter of the cylinder for which it is intended, severing the blank on a bevel around at least its circumference to a double ring, expanding the thus formed double ring radially and heat treating the expanded double ring so as to retain its new shape.

22. The process of producing a variably expansible flexible ring which comprises splitting on a slant a solid ring into a one piece double ring, permanently expanding the double ring evenly in radial direction.

23. The process of producing a variably expansible flexible piston ring which comprises splitting on a bevel a solid ring, permanently and evenly expanding it in radial direction, thus distributing its expansion substantially over the length, corresponding to the double circumference of the solid ring.

24. The process of producing a self adjusting and variably expansible flexible piston ring which comprises splitting on a bevel a solid ring into two integral rings, expanding it evenly and radially outwards and changing its molecular arrangement so as to retain its expanded shape.

Signed at New York city, in the county of New York and State of New York this 24th day of December A. D. 1918.

PAUL M. KLEIN.